Figure 1:
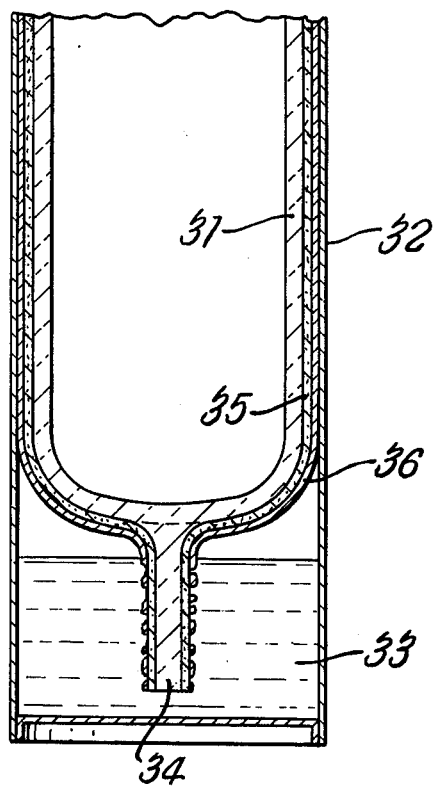

United States Patent [19]

Sudworth et al.

[11] 4,076,903
[45] Feb. 28, 1978

[54] ALKALI METAL-SULPHUR CELLS

[75] Inventors: James L. Sudworth; John M. Bird, both of Burton-on-Trent, England

[73] Assignee: British Railways Board, London, England

[21] Appl. No.: 707,579

[22] Filed: Jul. 22, 1976

[30] Foreign Application Priority Data

Aug. 16, 1975 United Kingdom ............... 32818/75

[51] Int. Cl.$^2$ ......................................... H01M 10/00
[52] U.S. Cl. .................................................. 429/104
[58] Field of Search ..................... 429/104, 31, 30, 33, 429/101, 102, 191, 105, 188, 218, 126

[56] References Cited

U.S. PATENT DOCUMENTS

| | | | |
|---|---|---|---|
| 3,748,178 | 7/1973 | Fally et al. | 429/104 |
| 3,770,502 | 11/1973 | Nakabayashi | 429/104 |
| 3,933,523 | 1/1976 | Dubin et al. | 429/191 |
| 3,980,496 | 9/1976 | Ludwig et al. | 429/103 |
| 3,982,959 | 9/1976 | Partridge et al. | 429/31 X |
| 3,993,503 | 11/1976 | Ludwig | 429/188 X |

Primary Examiner—Anthony Skapars
Attorney, Agent, or Firm—Pollock, Vande Sande & Priddy

[57] ABSTRACT

An alkali metal-sulphur cell has an outer tubular casing and an inner tubular solid electrolyte dividing the cell into anode and cathode compartments and whose interior provides one of such compartments. The outer tubular casing and the tubular solid electrolyte are spaced apart to define an annular space, which provides the other compartment of the cell.

A primary porous coating is provided on at least one surface of the solid electrolyte and an outer layer is provided on the primary porous coating, the outer layer being more dense than the primary porous coating.

10 Claims, 4 Drawing Figures

ALKALI METAL-SULPHUR CELLS

This invention relates to alkali metal-sulphur cells, in which the electrochemical reactants are liquid alkali metal, e.g. sodium, as negative active material (anode) and liquid sulphur material as positive active material (cathode) and in which the anode and cathode compartments are separated by a solid electrolyte which is a sodium ion conductor, such as beta-alumina.

In Hames and Tilley's U.S. application Ser. No. 679,626 filed Apr. 23, 1976, there is described an alkali-metal sulphur cell comprising an outer tubular casing, an inner tubular solid electrolyte whose interior provides one of said compartments and which is spaced from the outer casing to define an annular space, providing the other of said compartments, and a porous coating on one or both surfaces of the solid electrolyte. Said coating may be for example plasma sprayed onto the surface of the solid electrolyte.

Such coatings, when on the anode compartment side of the solid electrolyte, have the advantage that they perform a wicking action and therefore constitute means for distributing the alkali-metal over the outer surface of the solid electrolyte. It is not clear at this time whether this wicking action arises mainly from the capillary action of the pores in the metal coating or from the capillary action of a small gap formed at the interface between the solid electrolyte and the coating produced by the differential thermal expansion of the solid electrolyte and the coating when the cell is brought to its operating temperature. Aluminium, nickel and copper have proved successful as coatings.

According to the present invention, an outer layer of a dense and therefore strong material surrounds the primary porous coating. This may be achieved by various methods, for example (a) by altering the spraying conditions after the formation of the primary porous coating so that a denser coating is produced, (b) by dipping the primary coated solid electrolyte into a molten metal, (c) by vacuum depositing a layer of metal, (d) by electrolytically depositing a layer of metal and (e) by providing a shim around the outer surface of the primary porous coating.

The presently preferred method is to dip the primary coated electrolyte into a molten metal thus producing an outer layer in the form of a coherent strong coating which could be built-up in thickness by multiple dippings. It is of course necessary to ensure that the dipping metal does not close the pores of the primary coating as this may prevent the flow of alkali metal through the porous coating. It is also necessary to ensure that the choice of metals, dipping temperature and time is such that the primary coating does not melt. Many combinations of materials can be used for the primary coating and outer layer; one example is aluminium or copper as the primary coating with aluminium or aluminium alloy as the outer layer. Preferably the metal of the outer layer has a lower melting point than the material of the primary coating.

Constructions of sodium-sulphur cells in accordance with the invention will now be described by way of example with reference to the accompanying drawings, in which FIGS. 1 to 5 show sectional elevations of respective cell constructions.

Referring to FIG. 1, only the parts of the cell relevant to the invention have been shown. The cell comprises an inner tube 31 of beta-alumina which constitutes the electrolyte of the cell and an outer stainless steel or mild steel tube 32, which constitutes the cell case. The interior of the tube 31 defines the cathode compartment of the cell and in the charged condition of the cell contains sulphur. The cell case 32 extends below the beta-alumina tube 31 to define a sodium reservoir 33 from which sodium is drawn by capillary action, as will be described so that it is distributed over the outer surface of the beta-alumina tube 31.

The lower end of the beta-alumina tube 31 is provided with an extension 34 in the form of a tail dipping into the sodium reservoir 33. The outer surface of the beta-alumina tube 31 and its extension 34 are provided with a primary porous coating 35 and on this is provided an outer dense metal layer 36. The porous coating 35, which is for example of aluminium, is sprayed on and thus provides a wick for wicking the sodium metal from the reservoir 33 over the outer surface of the beta-alumina tube 31, and the outer layer 36, which can be provided by any of the methods discussed previously, protects the porous layer 35 against cracking at the operating temperature of the cell. The outer layer is for example an aluminium shim. Hence the anode compartment of the cell is defined by the thin porous layer 35 between the beta-alumina tube 31 and the outer layer 36. In addition to the capillary action of the layer 35, the sodium may be distributed along the anode compartment by a differential pressure arrangement.

The extension 34 can be provided in a number of ways before applying the coating 35. For example, it could be separately formed as a beta-alumina or other ceramic tube or rod which is glassed on to the tube 31, or it could be provided as an integral extension of the tube 31. Alternatively, the extension 34 could be provided as a shaped piece of metal which is attached to the tube 31 during spraying of coating 35. After applying the outer layer 36, it is necessary to fracture or abrade the lower end of the extension 34 to expose the porous coating 35.

In a modification of the cell construction described with reference to FIG. 1, a layer of nickel-plated carbon fibres or nickel-plated carbon felt is interposed between porous layer 35 and the shim 36 and is shaped to form the tail 34. In this case it is not necessary for the coating 35 to extend down the tail 34, since the nickel-plated carbon felt or fibres will act to wick the sodium up to the electrolyte tube 31.

Figure 2:
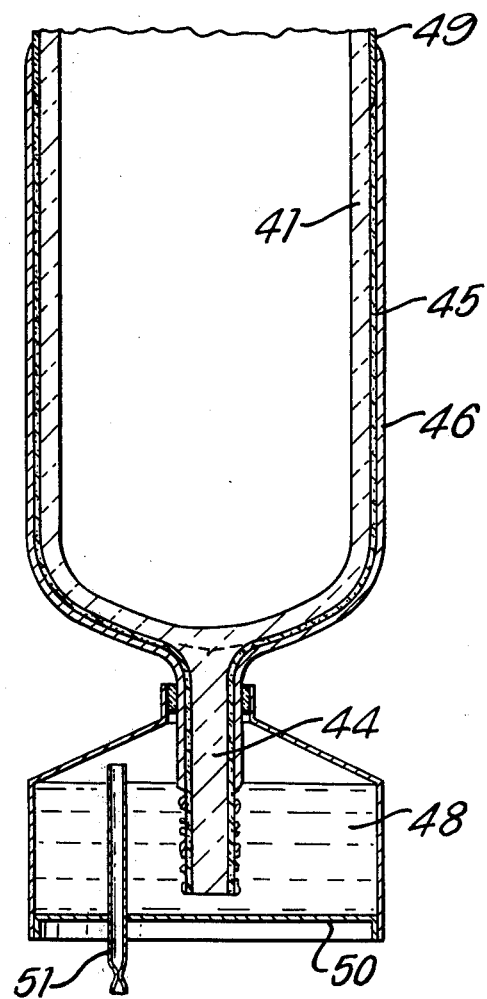

In the cell construction shown in FIG. 2 the outer metal cell casing 32 of FIG. 1 is dispensed with, outer metal layer 46 becoming the outer cell casing and extension 44 being sealed into the neck of a sodium reservoir 48.

In order to fabricate the cell in this manner it is necessary to apply an insulating coating 49, e.g. of glass, adjacent to the upper end of the electrolyte tube 41. The porous coating 45 is applied up to the level of the coating 49 and the outer layer 46 is applied, for example by dipping, to a level slightly above the lower edge of the insulating coating 49. This will ensure that no sodium metal will escape during charging of the cell from the interface between the coating 45 and the outer layer 46. The metal chosen for the outer layer 46 preferably has an expansion coefficient equal to or greater than that of the electrolyte tube material so that it will compress on to the tube during cooling, thus forming a good seal.

The seal between the extension 44 and the sodium reservoir 48 can be a brazed or welded seal and the sodium can be loaded into the reservoir 48 under vacuum prior to welding on the sealing cap 50. Alternatively, it could be loaded into the reservoir via tube 51 which could also be used to evacuate the cell. Evacuation is necessary to prevent the build-up of a back pressure in the porous layer 45. If desired, the whole assembly could be dipped into the metal forming the outer layer 46 after loading of the sodium, to ensure that all seals are leak tight.

The cell construction described with reference to FIG. 2 is inherently safe from spontaneous failure such as electrolyte fracture or short circuit since the wick provided by the porous layer 45 on the extension 44 can be designed to limit the flow of sodium to a rate equivalent to the maximum discharge rate, and the wick provided by the layer 45 on the tube 41 itself can be designed so that the volume of sodium contained in it is very small.

To improve the safety of the cell under impact conditions the extension 44 may be weakened, e.g. by notching the central core, so that the sodium reservoir 40 breaks away from the tube 41 in the case of impacts above a certain g value. Since only the cross section of the extension 44 would be exposed, the rate of sodium leakage from the reservoir 48 after detachment, would be negligible.

It will be appreciated that although the embodiments of FIGS. 1 and 2 have been described in terms of metal coating, other materials could be used as coatings, eg. alpha alumina or other ceramic spray coatings as the primary porous coating, with a glass as the outer layer applied by dipping or convential glazing methods. Similarly, the sodium reservoir could be fabricated from a ceramic. An advantage of using non-metallic materials would be that in the event of cell failure, the corrosive sodium poly-sulphides would be contained by the inert coatings.

The manufacture of these cells could be carried out by a variety of methods, but one method which may be particularly advantageous is described below with reference to FIG. 3.

Figure 3:
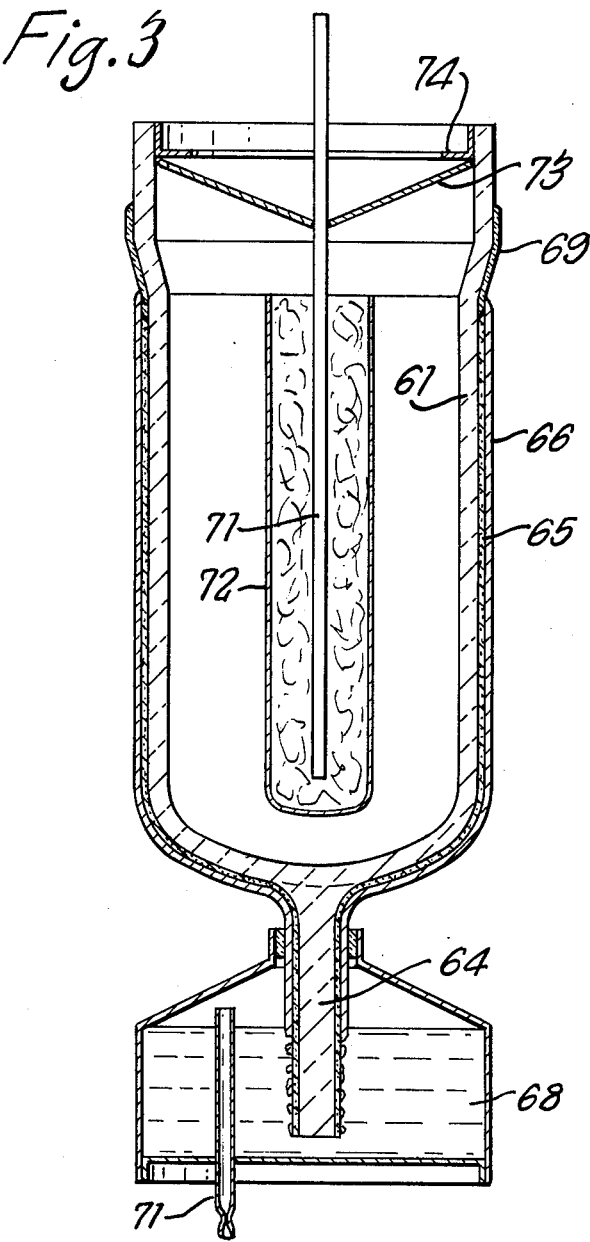

The electrolyte tube 61 is fabricated into the shape illustrated in FIG. 3. After sintering and annealing if necessary, the tube 61 is transferred from the furnace at a temperature above the melting point of the glass coating 69 to be applied. The glass coating 69 is then applied by flame or plasma spraying and forms a continuous film around the outside of the tube adjacent to the open end. The electrolyte tube 61 is then allowed to cool to a temperature below the melting point of the material to be used for the porous coating 65 (preferably this temperature should be less than 200° C below the melting point of the porous coating material). The porous coating is then applied by spraying. The sprayed electrolyte tube is then dipped in the molten metal to be used for the outer layer 66, so that the level of this coating is above the lower level of the glass coating 69.

The tube is then allowed to cool to room temperature, the end of extension 64 exposed by abrading or fracturing and the sodium reservoir 68 sealed on by brazing. The reservoir 68 is then charged with sodium, the remaining gas evacuated, and the reservoir sealed. The sulphur electrode and current collector 71, 72 are inserted, a compression load applied to the seals by spring 73 and the clamping collar 74 fixed into place by welding, brazing or glassing it to the top of the beta-alumina tube 61.

Figure 4:
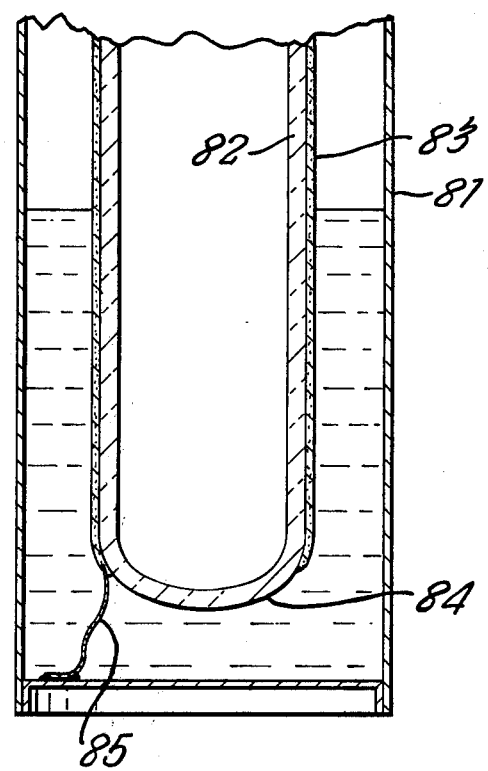

A further cell construction will now be described with reference to FIG. 4. The cell similarly to FIG. 1 has a metal outer case 81, a beta-alumina tube 82, the interior of the tube 82 constituting the cathode compartment. The lower end of the tube 82 is left uncoated to dip into the sodium in the bottom of the tube.

The annular space between the tubes 81 and 82 is of sufficient volume to hold enough sodium to completely react with all the sulphur during cell discharge. Means for distributing the sodium over the whole surface of the tube 82 as the level of sodium in the annular space drops comprises a porous coating 83 on the outside of the tube 82.

An area 84 constituted by the lower end of the tube 82 is not provided with a coating and is therefore bare to the sodium. By this means, the cell reactants can be loaded in charged state, i.e. as sodium and sulphur. In the previously described cell constructions, the cell reactants have to be loaded in the discharged state, i.e. as sodium polysulphide since the cycling of the cell can only be commenced with a charging cycle to cause the sodium to wet the porous coating so that it can continue to act as a wick.

With the area 84 left uncoated, an initial discharge followed by a charge will wet the coating 83 to start its operation for subsequent operational rate discharges. An electrical contact 85 between the cell case 81 and the coating 83 allows the cell to be re-started should accidental over-discharge occur when the cell is being operated in battery matrix.

We claim:

1. An alkali metal-sulphur cell comprising an outer tubular casing, an inner tubular solid electrolyte dividing the cell into anode and cathode compartments and whose interior provides one of said compartments of the cell, the inner tubular solid electrolyte being spaced from the outer casing to define an annular space, providing the other of said compartments, a primary porous coating provided on at least one surface of said solid electrolyte and an outer layer on said primary porous coating, said outer layer being more dense than said primary porous coating.

2. An alkali metal-sulphur cell according to claim 1, wherein said primary porous coating and said outer layer are provided on the surface of said solid electrolyte in the anode compartment.

3. An alkali metal-sulphur cell according to claim 2, wherein said outer layer comprises a second coating.

4. An alkali metal-sulphur cell according to claim 3, wherein said second coating is formed by dipping the primary coated solid electrolyte into a molten metal.

5. An alkali metal-sulphur cell according to claim 3, wherein said primary porous coating is selected from aluminium and copper and the second coating is aluminium.

6. An alkali metal-sulphur cell according to claim 1, wherein said primary porous coating is non-metallic and said outer layer is a glass coating.

7. An alkali metal-sulphur cell according to claim 1, wherein said outer layer comprises a metal shim.

8. An alkali metal-sulphur cell according to claim 1, wherein a tail extends from a closed end of said solid electrolyte into an alkali metal reservoir formed by the casing and incorporates means for wicking alkali metal into the primary porous layer.

9. An Alkali metal-sulphur cell according to claim 1, wherein said outer layer constitutes the casing of the cell and a tail extends from the closed end of the solid electrolyte tube and is formed at least by said outer layer and extends into an alkali metal reservoir through a narrow neck which is sealed to the tail, said tail incorporating means for wicking alkali metal into the primary porous coating.

10. An alkali metal-sulphur cell according to claim 9, wherein said outer layer is of metal and at its end remote from the tail extends onto a glass coating formed on the outer surface of the solid electrolyte.

* * * * *